US011067308B2

(12) United States Patent
Goel et al.

(10) Patent No.: US 11,067,308 B2
(45) Date of Patent: Jul. 20, 2021

(54) METHOD AND APPARATUS FOR RE-HEAT DEHUMIDIFICATION UTILIZING A VARIABLE SPEED COMPRESSOR SYSTEM

(71) Applicant: Lennox Industries Inc., Richardson, TX (US)

(72) Inventors: Rakesh Goel, Irving, TX (US); Derek Phillips, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 16/502,203

(22) Filed: Jul. 3, 2019

(65) Prior Publication Data

US 2019/0323722 A1     Oct. 24, 2019

Related U.S. Application Data

(63) Continuation of application No. 15/044,243, filed on Feb. 16, 2016, now Pat. No. 10,386,089.

(51) Int. Cl.
*F24F 11/77* (2018.01)
*F24F 1/0003* (2019.01)
(Continued)

(52) U.S. Cl.
CPC ............ *F24F 11/77* (2018.01); *F24F 1/0003* (2013.01); *F24F 3/044* (2013.01); *F24F 3/14* (2013.01);
(Continued)

(58) Field of Classification Search
CPC .... F24F 2110/10; F24F 2110/12; F24F 11/80; F24F 11/30; F24F 11/70; F24F 11/871;
(Continued)

(56) References Cited

U.S. PATENT DOCUMENTS 4,408,713 A   10/1983   Iijima et al.
4,744,223 A    5/1988   Umezu
(Continued)

FOREIGN PATENT DOCUMENTS

AU   2011100169 A4    3/2011
CA      2775540 A1   11/2012
(Continued)

OTHER PUBLICATIONS

U.S. Appl. No. 14/954,531, Goel et al.
(Continued)

*Primary Examiner* — Len Tran
*Assistant Examiner* — Jenna M Hopkins
(74) *Attorney, Agent, or Firm* — Shackelford, Bowen, McKinley & Norton, LLP (57) ABSTRACT

A heating, ventilation, and air conditioning (HVAC) system for regulating humidity of an enclosed space. The HVAC system includes an evaporator coil. A metering device is fluidly coupled to the evaporator coil. A variable-speed compressor is fluidly coupled to the condenser coil and the evaporator coil and a controller is operatively coupled to the variable-speed compressor. A humidity sensor is operatively coupled to the controller and exposed to the enclosed space. Responsive to a determination that the relative humidity of the enclosed space exceeds the maximum humidity threshold, the controller adjusts a speed of the variable-speed compressor to increase latent capacity of the HVAC system. Responsive to a determination that the relative humidity of the enclosed space falls below the minimum humidity threshold, the controller adjusts a speed of the variable-speed compressor to decrease latent capacity of the HVAC system.

18 Claims, 7 Drawing Sheets

(51) Int. Cl.
*F24F 3/044* (2006.01)
*F24F 3/14* (2006.01)
*F25B 49/02* (2006.01)
*F24F 110/20* (2018.01)
*F24F 120/20* (2018.01)
*F24F 11/30* (2018.01)
*F24F 110/10* (2018.01)
*F24F 110/12* (2018.01)
*F24F 11/52* (2018.01)
*F24F 140/20* (2018.01)
*F25B 39/02* (2006.01)

(52) U.S. Cl.
CPC ............ *F24F 3/1405* (2013.01); *F25B 49/02* (2013.01); *F24F 11/30* (2018.01); *F24F 11/52* (2018.01); *F24F 2110/10* (2018.01); *F24F 2110/12* (2018.01); *F24F 2110/20* (2018.01); *F24F 2120/20* (2018.01); *F24F 2140/20* (2018.01); *F24F 2221/16* (2013.01); *F25B 39/028* (2013.01); *F25B 2600/0253* (2013.01); *F25B 2600/11* (2013.01); *F25B 2700/02* (2013.01); *F25B 2700/21171* (2013.01); *F25B 2700/21174* (2013.01); *Y02B 30/70* (2013.01)

(58) Field of Classification Search
CPC .......... F24F 2140/50; F25B 2313/0294; F25B 2313/0293; F25B 49/02; F25B 2600/11; F25B 2600/111; F25B 2700/172; F25B 2700/2117; F25B 2701/21172; F25B 2700/21173; Y02B 40/32; Y02B 30/746
See application file for complete search history.

(56) References Cited

U.S. PATENT DOCUMENTS

| | | | |
|---|---|---|---|
| 4,813,474 A | 3/1989 | Umezu | |
| 4,873,649 A | 10/1989 | Grald et al. | |
| 5,058,388 A | 10/1991 | Shaw et al. | |
| 5,062,276 A * | 11/1991 | Dudley | F24F 11/00 62/176.6 |
| 5,095,715 A | 3/1992 | Dudley | |
| 5,481,166 A | 1/1996 | Moreira | |
| 5,533,352 A * | 7/1996 | Bahel | F24F 11/30 62/180 |
| 5,623,834 A * | 4/1997 | Bahel | F25B 49/005 62/131 |
| 5,832,744 A | 11/1998 | Dorste et al. | |
| 6,055,819 A | 5/2000 | Kang | |
| 6,070,110 A * | 5/2000 | Shah | F24F 11/0008 165/205 |
| 6,427,454 B1 | 8/2002 | West | |
| 6,560,980 B2 * | 5/2003 | Gustafson | F25B 49/02 62/186 |
| 6,594,554 B1 * | 7/2003 | Seem | F24F 11/77 700/276 |
| 6,789,881 B2 | 9/2004 | Silverbrook | |
| 6,792,767 B1 | 9/2004 | Pargeter et al. | |
| 6,826,921 B1 | 12/2004 | Uselton | |
| 6,826,922 B2 | 12/2004 | Patel et al. | |
| 7,080,521 B2 * | 7/2006 | Ludwig | F25D 29/00 62/208 |
| 7,770,405 B1 | 8/2010 | Dillon | |
| 7,836,713 B2 * | 11/2010 | Lifson | F25B 49/025 62/179 |
| 8,229,597 B2 * | 7/2012 | Burton | G05B 15/02 700/276 |
| 8,397,522 B2 | 3/2013 | Springer et al. | |
| 8,484,990 B2 * | 7/2013 | Ballet | F25B 1/10 62/183 |
| 8,538,585 B2 * | 9/2013 | Thogersen | F25D 29/003 700/275 |
| 8,689,582 B2 | 4/2014 | Birkelund et al. | |
| 8,948,918 B2 | 2/2015 | Chamorro et al. | |
| 9,638,434 B2 * | 5/2017 | Alston | F24F 1/04 |
| 9,752,815 B2 * | 9/2017 | Saitou | F25B 49/027 |
| 9,777,724 B2 * | 10/2017 | Zhou | F24F 11/30 |
| 10,047,989 B2 * | 8/2018 | Huff | F25B 41/043 |
| 2005/0056042 A1 | 3/2005 | Bourne et al. | |
| 2005/0241325 A1 | 11/2005 | Olney | |
| 2005/0278071 A1 | 12/2005 | Durham | |
| 2007/0227168 A1 * | 10/2007 | Simmons | F24F 1/027 62/229 |
| 2008/0098756 A1 | 5/2008 | Uselton | |
| 2008/0245083 A1 | 10/2008 | Tutunoglu et al. | |
| 2008/0307803 A1 * | 12/2008 | Herzon | F24F 3/147 62/93 |
| 2009/0192650 A1 | 7/2009 | Tonner | |
| 2009/0205354 A1 | 8/2009 | Brown | |
| 2009/0277193 A1 | 11/2009 | Springer et al. | |
| 2010/0064722 A1 * | 3/2010 | Taras | F25B 49/02 62/498 |
| 2010/0082161 A1 | 4/2010 | Patch | |
| 2010/0082162 A1 | 4/2010 | Mundy et al. | |
| 2010/0307733 A1 | 12/2010 | Karamanos et al. | |
| 2011/0083454 A1 | 4/2011 | Kopko et al. | |
| 2011/0208325 A1 | 8/2011 | Liu | |
| 2011/0301762 A1 | 12/2011 | Walker et al. | |
| 2012/0137713 A1 * | 6/2012 | Duraisamy | F25D 29/003 62/228.1 |
| 2012/0291984 A1 * | 11/2012 | Li | F24F 11/77 165/11.1 |
| 2012/0303165 A1 | 11/2012 | Qu et al. | |
| 2012/0318007 A1 | 12/2012 | Lukasse et al. | |
| 2013/0061619 A1 | 3/2013 | Saitou et al. | |
| 2013/0213064 A1 | 8/2013 | Gomes et al. | |
| 2013/0255297 A1 | 10/2013 | Matsuoka et al. | |
| 2014/0131009 A1 | 5/2014 | Zhou et al. | |
| 2014/0245762 A1 | 9/2014 | Schlesinger | |
| 2014/0345307 A1 * | 11/2014 | Bagley | F24F 11/30 62/115 |
| 2014/0360211 A1 | 12/2014 | Hovel et al. | |
| 2015/0021005 A1 | 1/2015 | Land, III | |
| 2015/0059373 A1 * | 3/2015 | Maiello | F25B 49/022 62/115 |
| 2015/0075766 A1 | 3/2015 | Alston | |
| 2015/0233623 A1 | 8/2015 | Izadi-Zamanabadi et al. | |
| 2015/0323423 A1 | 11/2015 | Alsaleem | |
| 2015/0337831 A1 | 11/2015 | Zhou et al. | |
| 2016/0273815 A1 | 9/2016 | Downie et al. | |
| 2017/0268797 A1 * | 9/2017 | Mowris | F24F 11/77 |

FOREIGN PATENT DOCUMENTS

WO  WO-8912269 A1  12/1989
WO  WO-97/32167 A1  9/1997

OTHER PUBLICATIONS

U.S. Appl. No. 14/954,558, Goel et al.
U.S. Appl. No. 15/044,243, Goel et al.
U.S. Appl. No. 15/177,639, Goel.
U.S. Appl. No. 15/177,585, Goel.
Research and Development Roadmap for Emerging HVAC Technologies—Goetzier et al. (Oct. 2014).

* cited by examiner

METHOD AND APPARATUS FOR RE-HEAT DEHUMIDIFICATION UTILIZING A VARIABLE SPEED COMPRESSOR SYSTEM

CROSS REFERENCE TO RELATED APPLICATIONS

This application is a continuation of and incorporates by reference U.S. patent application Ser. No. 15/044,243, filed on Feb. 16, 2016. This patent application incorporates by reference for any purpose the entire disclosure of the U.S. patent application Ser. Nos. 14/954,531 and 14/954,558, filed on Nov. 30, 2015.

TECHNICAL FIELD

The present invention relates generally to heating, ventilation, and air conditioning (HVAC) systems and more particularly, but not by way of limitation, to utilizing variable compressor speed to maximize latent capacity of an HVAC system.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

A heating, ventilation, and air conditioning (HVAC) system for regulating humidity of an enclosed space. The HVAC system includes an evaporator coil. A metering device is fluidly coupled to the evaporator coil via a distributor line. The HVAC system further includes a variable-speed circulation fan for circulating air around the evaporator coil and a condenser coil fluidly coupled to the metering device. A variable-speed compressor is fluidly coupled to the condenser coil and the evaporator coil and a controller is operatively coupled to the variable-speed compressor. A humidity sensor is operatively coupled to the controller and exposed to the enclosed space. The humidity sensor is configured to measure a relative humidity of the enclosed space and detect if the relative humidity of the enclosed space exceeds a maximum humidity threshold or falls below a minimum humidity threshold. Responsive to a determination that the relative humidity of the enclosed space exceeds the maximum humidity threshold, the controller is configured to adjust a speed of the variable-speed compressor to increase latent capacity of the HVAC system. Responsive to a determination that the relative humidity of the enclosed space falls below the minimum humidity threshold, the controller is configured to adjust a speed of the variable-speed compressor to decrease latent capacity of the HVAC system.

A method of regulating humidity of an enclosed space. The method includes measuring an environmental condition associated with the enclosed space and comparing the measured environmental condition to a pre-determined set point. The method includes determining if the measured environmental condition exceeds the pre-determined set point. Responsive, to a determination that the measured environmental condition exceeds the pre-determined set point, a speed of a variable-speed compressor is adjusted via at least one controller. Adjusting the speed of the variable-speed compressor includes increasing a latent capacity of a heating, ventilation, and air conditioning (HVAC) system.

A heating, ventilation, and air conditioning (HVAC) system for regulating humidity of an enclosed space. The HVAC system includes an evaporator coil, a metering device fluidly coupled to the evaporator coil via a distributor line, and a variable-speed circulation fan for circulating air around the evaporator coil. A condenser coil is fluidly coupled to the metering device. A variable-speed compressor is fluidly coupled to the condenser coil and the evaporator coil. A controller is operatively coupled to the variable-speed compressor. A first temperature sensor is thermally exposed to the distributor line and operatively coupled to the controller. A humidity sensor is operatively coupled to the controller and exposed to the enclosed space. The humidity sensor is configured to measure a relative humidity of the enclosed space and detect if the relative humidity of the enclosed space exceeds a maximum humidity threshold or falls below a minimum humidity threshold. Responsive to a determination that the relative humidity of the enclosed space exceeds the maximum humidity threshold, a speed of the variable-speed compressor is adjusted to increase latent capacity of the HVAC system. Responsive to a determination that the relative humidity of the enclosed space falls below the minimum humidity threshold, a speed of the variable-speed compressor is adjusted to decrease latent capacity of the HVAC system. The controller is configured to adjust a speed of the variable-speed circulation fan to increase latent capacity of the HVAC system responsive to a determination that a temperature of fluid in the distributor line exceeds an optimal distributor line temperature.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions. In a typical embodiment, the S/T ratio is negative in the case of heating.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort.

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs.

Another air dehumidification approach involves re-heating of air leaving an evaporator coil. This approach may also result in over-cooling of the conditioned air and results in occupant discomfort.

Figure 1:
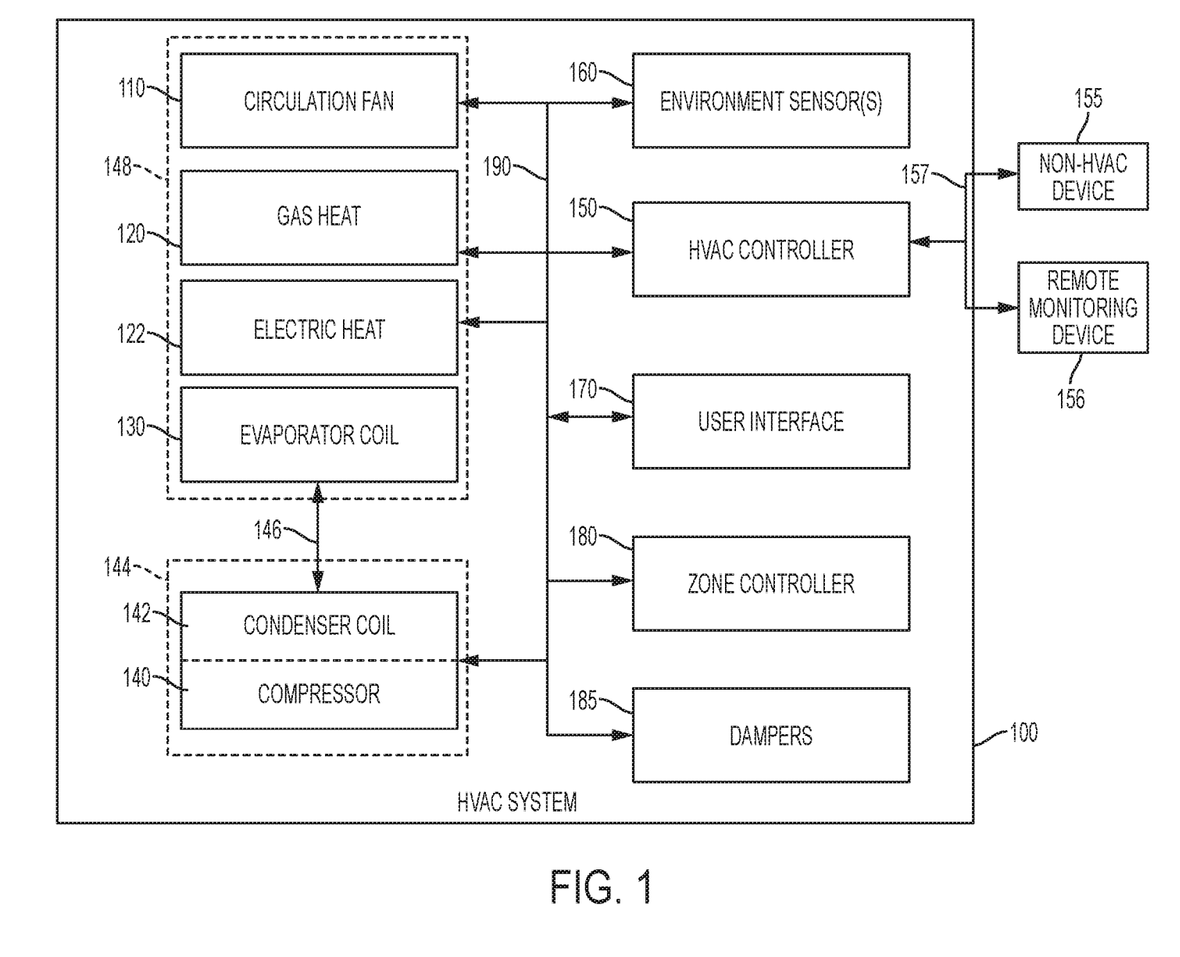
FIG. 1 is a block diagram of an exemplary HVAC system.
Figure 2A:
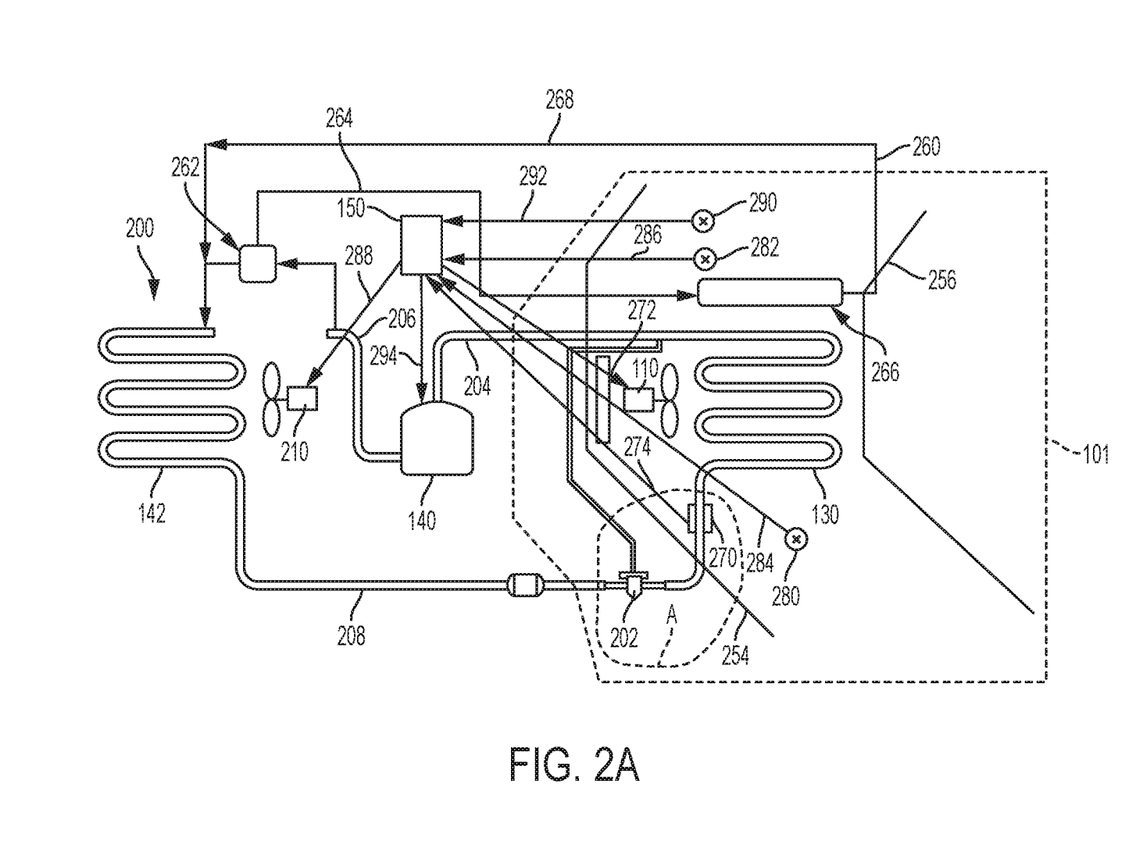
FIG. 2A is a schematic diagram of an exemplary package HVAC system having a re-heat loop.
Figure 2B:
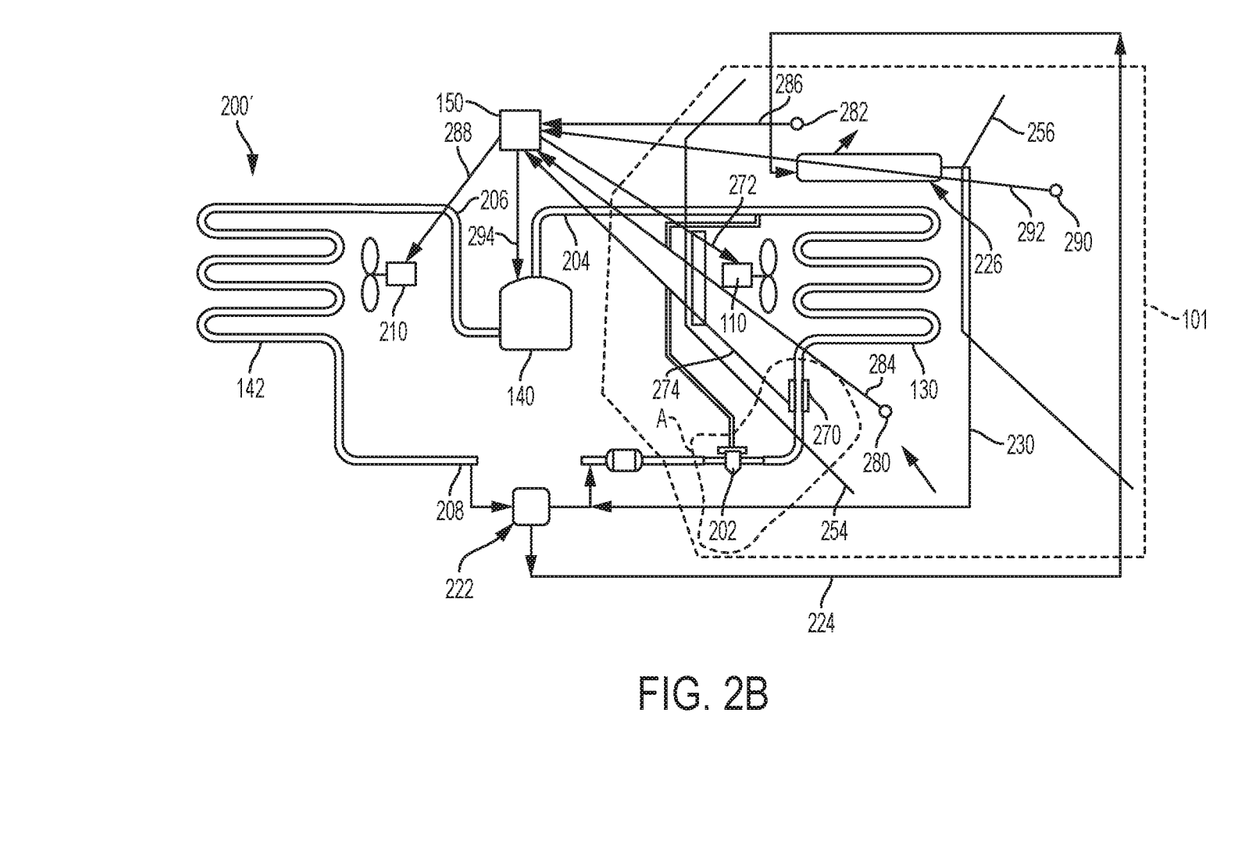
FIG. 2B is a schematic diagram of an exemplary split HVAC system having a re-heat loop.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101 (shown in FIG. 2). In a typical embodiment, the enclosed space 101 (shown in FIG. 2) is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 110, a gas heat 120, electric heat 122 typically associated with the variable-speed circulation fan 110, and a refrigerant evaporator coil 130, also typically associated with the variable-speed circulation fan 110. The variable-speed circulation fan 110, the gas heat 120, the electric heat 122, and the refrigerant evaporator coil 130 are collectively referred to as an "indoor unit" 148. In a typical embodiment, the indoor unit 148 is located within, or in close proximity to, the enclosed space 101 (shown in FIG. 2). The HVAC system 100 also includes a variable-speed compressor 140 and an associated condenser coil 142, which are typically referred to as an "outdoor unit" 144. In various embodiments, the outdoor unit 144 is, for example, a rooftop unit or a ground-level unit. The variable-speed compressor 140 and the associated condenser coil 142 are connected to an associated evaporator coil 130 by a refrigerant line 146. In a typical embodiment, the variable-speed compressor 140 is, for example, a single-stage compressor, a multi-stage compressor, a single-speed compressor, or a variable-speed compressor. The variable-speed circulation fan 110, sometimes referred to as a blower, is configured to operate at different capacities (i.e., variable motor speeds) to circulate air through the HVAC system 100, whereby the circulated air is conditioned and supplied to the enclosed space 101 (shown in FIG. 2).

Still referring to FIG. 1, the HVAC system 100 includes an HVAC controller 150 that is configured to control operation of the various components of the HVAC system 100 such as, for example, the variable-speed circulation fan 110, the gas heat 120, the electric heat 122, and the variable-speed compressor 140 to regulate the environment of the enclosed space 101 (shown in FIG. 2). In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101 (shown in FIG. 2).

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101 (shown in FIG. 2). In a typical embodiment, the HVAC controller 150 also includes a processor and a memory to direct operation of the HVAC system 100 including, for example, a speed of the variable-speed circulation fan 110.

Still referring to FIG. 1, in some embodiments, the plurality of environment sensors 160 is associated with the HVAC controller 150 and also optionally associated with a user interface 170. The plurality of environment sensors 160 provide environmental information within a zone or zones of the enclosed space 101 (shown in FIG. 2) such as, for example, temperature and humidity of the enclosed space 101 (shown in FIG. 2) to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101 (shown in FIG. 2), and calculate operational parameters of the HVAC system 100 as disclosed herein.

In a typical embodiment, the HVAC system 100 is configured to communicate with a plurality of devices such as, for example, a monitoring device 156, a communication device 155, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101 (shown in FIG. 2). Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101 (shown in FIG. 2).

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the variable-speed circulation fan 110 or the plurality of environment sensors 160.

FIG. 2A is a schematic diagram of an exemplary package HVAC system 200 having a re-heat loop 260. For illustrative purposes, FIG. 2A will be described herein relative to FIG. 1. The package HVAC system 200 includes the refrigerant evaporator coil 130, the condenser coil 142, the variable-speed compressor 140, and a metering device 202. In a typical embodiment, the metering device 202 is, for example, a thermostatic expansion valve or a throttling valve. The refrigerant evaporator coil 130 is fluidly coupled to the variable-speed compressor 140 via a suction line 204. The variable-speed compressor 140 is fluidly coupled to the condenser coil 142 via a discharge line 206. The condenser coil 142 is fluidly coupled to the metering device 202 via a liquid line 208.

Still referring to FIG. 2A, during operation, low-pressure, low-temperature refrigerant is circulated through the refrigerant evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the refrigerant evaporator coil 130 by the variable-speed circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the variable-speed compressor 140 via the suction line 204. In a typical embodiment, the variable-speed compressor 140 increases the pressure of the low-pressure, low-temperature, super-heated vapor refrigerant and, by operation of the ideal gas law, also increases the temperature of the low-pressure, low-temperature, superheated vapor refrigerant to form a high-pressure, high-temperature, superheated vapor refrigerant. The high-pressure, high-temperature, superheated vapor refrigerant enters a three-way valve 262 where at least a portion of the high-pressure, high-temperature, superheated vapor refrigerant is diverted into a re-heat feed line 264. The re-heat feed line 264 directs the high-pressure, high-temperature, superheated vapor refrigerant to a re-heat coil 266. In a typical embodiment, the re-heat coil 266 is positioned in a supply duct 256 downwind from the evaporator coil 130. The re-heat coil 266 facilitates transfer of a portion of the heat stored in the high-pressure, high-temperature, superheated vapor refrigerant to air moving through the supply duct 256 thereby heating the air in the supply duct 256. If the high-pressure, high-temperature, superheated vapor refrigerant is warmer, more heat can be transferred to the air in the supply duct 256 thereby causing a temperature of the air in the supply duct 256 to be closer to a temperature of air in a return duct 254. After leaving the re-heat coil 266, the high-pressure, high-temperature, superheated vapor refrigerant travels through a re-heat return line 268 and enters the condenser coil 142.

Outside air is circulated around the condenser coil 142 by a variable-speed condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

FIG. 2B is a schematic diagram of an exemplary split HVAC system 200' having a re-heat loop 280. For illustrative purposes, FIG. 2B will be described herein relative to FIGS. 1-2A. The split HVAC system 200' is similar in operation and construction to the package HVAC system 200. In the split HVAC system 200', the high-pressure, high-temperature, sub-cooled liquid refrigerant leaves the condenser coil 142 via the liquid line 208 and enters a three way valve 222 where a portion of the high-pressure, high-temperature, sub-cooled liquid refrigerant is diverted into a re-heat feed line 224. The re-heat feed line 224 directs the high-pressure, high-temperature, sub-cooled liquid refrigerant to a re-heat coil 226. In a typical embodiment, the re-heat coil 226 is positioned in the supply duct 256 downwind from the evaporator coil 130. The re-heat coil 226 facilitates transfer of a portion of the heat stored in the high-pressure, high-temperature, sub-cooled liquid refrigerant to air moving through the supply duct 256 thereby heating the air in the supply duct 256. If the high-pressure, high-temperature, sub-cooled liquid refrigerant is warmer, more heat can be transferred to the air in the supply duct 256 thereby causing a temperature of the air in the supply duct 256 to be closer to a temperature of air in the return duct 254. After leaving the re-heat coil 226, the high-pressure, high-temperature, sub-cooled liquid refrigerant travels through a re-heat return line 230 and enters the metering device 202.

Figure 2C:
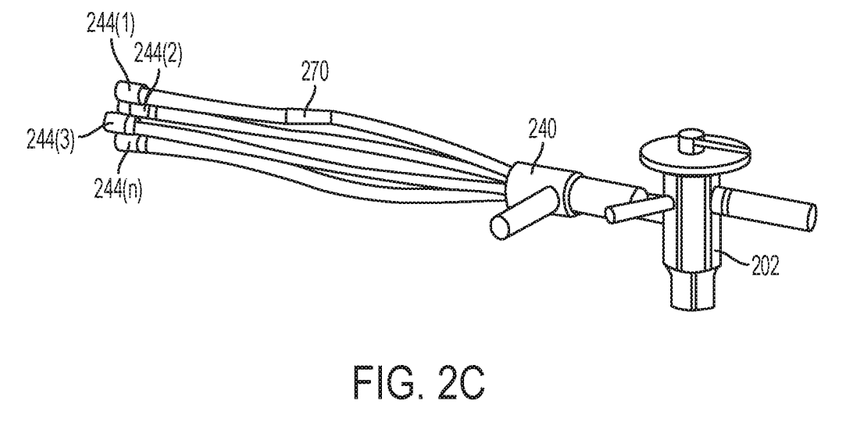
FIG. 2C is a detailed view of Area A of FIGS. 2A and 2B.

FIG. 2C is a detailed view of Area A of FIGS. 2A and 2B. The metering device 202 is fluidly coupled to a distributor 240. The distributor 240 distributes flow of the liquid/vapor refrigerant mixture emerging from the metering device 202 into a plurality of distributor lines 244(1)-244(n). The distributor lines 244(1)-244(n) enter the evaporator coil 130.

Still referring to FIGS. 2A-2C collectively, a distributor-line temperature sensor 270 is thermally exposed to at least one distributor line of the plurality of distributor lines 244(1)-244(n) before the at least one distributor line enters the evaporator coil 130 thereby ensuring that a temperature of the at least one distributor line is approximately equal to a temperature of the plurality of distributor lines 244(1)-244(n). By way of example, the distributor-line temperature sensor 270 is shown in FIG. 2C as being thermally exposed to distributor line 244(1); however, in other embodiments, the distributor-line temperature sensor 270 is thermally exposed to any of the distributor lines 244(1)-244(n). In a typical embodiment, the distributor-line temperature sensor 270 is, for example, a thermistor; however, in other embodiments, the distributor-line temperature sensor 270 may be a thermocouple, a thermometer, or other appropriate device as dictated by design requirements. In a typical embodiment, the distributor-line temperature sensor 270 measures a temperature of the liquid/vapor refrigerant mixture in the selected distributor line 244(a). The distributor-line temperature is used as a proxy for saturated suction temperature.

The distributor-line temperature sensor 270 communicates with the HVAC controller 150 as illustrated in FIGS. 2A and 2B by arrow 274. In various embodiments, the distributor-line temperature sensor 270 communicates with the HVAC controller 150 via, for example, a wired connection or a wireless connection. In a typical embodiment, the HVAC controller 150 determines a required latent load on the package HVAC system 200 or the split HVAC system 200' based on a relative humidity percentage of the enclosed space 101 and a pre-determined desired relative humidity. In a typical embodiment, the relative humidity of the enclosed space 101 is determined via at least one sensor of the plurality of environment sensors 160. In a typical embodiment, the pre-determined desired relative humidity percentage is, for example, input into the HVAC controller 150 via, for example, the user interface 170. In other embodiments, the pre-determined desired relative humidity percentage is input into the HVAC controller 150 by, for example, a user or a manufacturer.

The HVAC controller 150 calculates an optimal distributor line temperature that provides an optimum S/T ratio. If the distributor line temperature as measured by the distributor-line temperature sensor 270 reaches a maximum threshold value, the HVAC controller 150 transmits a signal 272 to the variable-speed circulation fan 110 to reduce a speed of the variable-speed circulation fan 110. In various embodiments, the signal 272 is transmitted via a wired connection or wireless connection as dictated by design requirements. Reducing the speed of the variable-speed circulation fan 110 lowers the temperature of the evaporator coil 130. As will be shown and discussed below, lowering the temperature of the evaporator coil 130 increases latent capacity of the HVAC system 100. In a typical embodiment, the speed of the variable-speed circulation fan 110 can be lowered until the temperature of the evaporator coil 130 reaches a freezing temperature of water. In a typical embodiment, temperature hysteresis could be utilized to prevent undesirable switching between speeds of the variable-speed circulation fan 110. Cooling the evaporator coil 130 to a temperature colder than the freezing temperature of water results in formation of frost on the evaporator coil 130 and causes damage to the HVAC system 100. The optimal temperature of the evaporator coil 130 varies with indoor dry-bulb temperature, indoor relative humidity, and outdoor temperature. Thus, the optimal distributor line temperature must be constantly modulated for optimal results. In a typical embodiment, the temperature of the evaporator coil 130 is measured at periodic time intervals such as, for example, every five seconds; however, in other embodiments, the temperature of the evaporator coil is measured continuously.

Still referring to FIGS. 2A-2B collectively, a first temperature sensor 280 is disposed in a return air duct 254 and a second temperature sensor 282 is disposed in a supply air duct 256. In a typical embodiment, the first temperature sensor 280 and the second temperature sensor 282 are, for example, thermistors; however, in other embodiments, the first temperature sensor 280 and the second temperature sensor 282 may be thermocouples, thermometers, or other appropriate devices as dictated by design requirements. The first temperature sensor 280 measures a temperature of air moving through the return air duct 254 and the second temperature sensor 282 measures a temperature of air moving through the supply air duct 256.

The first temperature sensor 280 and the second temperature sensor 282 transmit signals to the HVAC controller 150 corresponding to air temperature values in the return air duct 254 and the supply air duct 256, respectively. The signals transmitted by the first temperature sensor 280 and the second temperature sensor 282 are illustrated in FIGS. 2A-2B by arrows 284 and 286, respectively. The first temperature sensor 280 and the second temperature sensor 282 may communicate with the HVAC controller 150 via, for example, a wired connection or a wireless connection. The HVAC controller 150 determines a difference between the air temperature in the return air duct 254 and the air temperature in the supply air duct 256. In a typical embodiment, the HVAC controller 150 determines the air-temperature difference at periodic time intervals such as, for example, every five seconds and determines whether the air-temperature difference is increasing, decreasing, or remaining stable. In other embodiments, the air-temperature difference is measured continuously.

If the air-temperature difference is stable, no adjustment is made to the speed of the variable-speed condenser fan 210 and the HVAC controller 150 continues to continuously or periodically calculate the air-temperature difference. However, if the air-temperature difference increases, the HVAC controller 150 determines that over-cooling of the conditioned air is occurring. In various embodiments, occurrence of over-cooling is determined by comparing a temperature of the enclosed space 101 to a set-point temperature of a thermostat in the enclosed space 101. In various other embodiments, occurrence of over-cooling is determined by measuring temperature variations over time of air in the supply air duct 256 or of air in the return air duct 254.

Responsive to the determination that over-cooling occurs, the HVAC controller 150 transmits a signal 288 to the variable-speed condenser fan 210 to reduce a speed of the variable-speed condenser fan 210. The signal 288 may be transmitted via a wired connection or wireless connection. Reducing the speed of the variable-speed condenser fan 210 causes refrigerant entering the re-heat coil 266, 226 to be warmer. Higher refrigerant temperature in the re-heat coil 266, 226 facilitates transfer of additional heat to air in the supply duct 256, which serves to mitigate the over-cooling of the conditioned air in the enclosed space 101. In a typical embodiment, temperature hysteresis could be utilized to prevent undesirable switching between speeds of the variable-speed condenser fan 210. In various embodiments, the HVAC controller 150 transmits a signal to the variable-speed condenser fan 210 to turn off the variable-speed condenser fan 210. In other embodiments, the HVAC controller 150 cycles the variable-speed condenser fan 210 between different speeds or between an operational state and a turned-off state. In a typical embodiment, adjusting the speed of the variable-speed condenser fan 210 maintains the S/T ratio of the package HVAC system 200 or the split HVAC system 200' in a range of approximately −0.1 to approximately 0.1. Maintaining the S/T ratio close to zero maximizes the latent capacity of the package HVAC system 200 or the split HVAC system 200' and facilitates air dehumidification without an associated change in air temperature. In a typical embodiment, if the speed of the variable-speed condenser fan 210 is reduced excessively, discharge pressure may rise above safe limits.

If the air-temperature difference decreases, the HVAC controller 150 determines that over-heating of the conditioned air in the enclosed space 101 is occurring. Responsive to the determination that over-heating occurs, the HVAC controller 150 transmits the signal 288 to the variable-speed condenser fan 210 to increase the speed of the variable-speed condenser fan 210. The signal 288 may be transmitted via a wired connection or wireless connection. Increasing the speed of the variable-speed condenser fan 210 causes refrigerant entering the re-heat coil 266, 226 to be cooler. Lower refrigerant temperature in the re-heat coil 266, 226 allows transfer of less heat to air in the supply duct 256, which serves to mitigate over-heating of the conditioned air in the enclosed space 101. In a typical embodiment, adjusting the speed of the variable-speed condenser fan 210 maintains the S/T ratio of the package HVAC system 200 or the split HVAC system 200' in the range of approximately −0.1 to approximately 0.1. Maintaining the S/T ratio close to zero maximizes the latent capacity of the package HVAC system 200 or the split HVAC system 200' and facilitates air dehumidification without an associated change in air temperature within the enclosed space 101. In a typical embodiment, temperature hysteresis could be utilized to prevent undesirable switching between speeds of the variable-speed condenser fan 210. In other embodiments, the HVAC controller 150 modulates a speed of the variable-speed condenser fan 210 responsive to a temperature change in the enclosed space 101. In other embodiments, the HVAC controller 150 modulates a speed of the variable-speed condenser fan 210 responsive to a temperature change in the supply air duct 256 or the return air duct 254.

Still referring to FIGS. 2A-2B collectively, a relative-humidity sensor 290 is disposed in the enclosed space 101.

In a typical embodiment, the relative-humidity sensor 290 measures relative humidity of the enclosed space 101. In a typical embodiment, the relative-humidity sensor 290 may be, for example, a capacitive humidity sensor or any other type of humidity sensor as dictated by design requirements. The relative-humidity sensor 290 communicates a measured relative humidity of the enclosed space 101 to the HVAC controller 150. In a typical embodiment, the measured relative humidity of the enclosed space 101 is expressed as a percentage of a partial pressure of water vapor at a particular temperature to an equilibrium pressure of water at the same temperature. In a typical embodiment, the relative-humidity sensor 290 communicates with the HVAC controller 150 via, for example, a wired connection or a wireless connection. Communication between the relative-humidity sensor 290 and the HVAC controller 150 is illustrated graphically in FIGS. 2A-2B via arrow 292. The HVAC controller 150 compares the measured relative humidity percentage of the enclosed space 101 with a setpoint relative humidity. In a typical embodiment, the setpoint relative humidity may be set by a user via, for example, the user interface 170. In other embodiments, the setpoint relative humidity may be programmed by a manufacturer. In a typical embodiment, the setpoint relative humidity is, for example, an acceptable humidity percentage range such as, for example, between approximately 45% and approximately 55%. Responsive to a determination that the measured relative humidity of the enclosed space 101 exceeds a maximum humidity threshold of the acceptable humidity percentage range, the HVAC controller 150 transmits a signal 294 to the variable-speed compressor 140 to increase a speed of the variable-speed compressor 140 In a typical embodiment, the signal 294 is transmitted via a wired connection or a wireless connection as dictated by design requirements. Increasing the speed of the variable-speed compressor 140 increases latent capacity of the package HVAC system 200 or the split HVAC system 200' thereby facilitating additional dehumidification of air discharged by the package HVAC system 200 or the split HVAC system 200' into the enclosed space 101.

Responsive to a determination by the HVAC controller 150 that the measured relative humidity percentage of the enclosed space 101 is below a minimum humidity threshold of the acceptable humidity percentage range, the HVAC controller 150 transmits the signal 294 to the variable-speed compressor 140 to reduce a speed of the variable-speed compressor 140. Reducing the speed of the variable-speed compressor 140 reduces the latent capacity of the package HVAC system 200 and the split HVAC system 200' thereby reducing dehumidification of air discharged by the package HVAC system 200 or the split HVAC system 200' into the enclosed space 101. In a typical embodiment, relative-humidity hysteresis could be utilized to prevent undesirable switching between speeds of the variable-speed compressor 140. In a typical embodiment, the relative-humidity sensor 290 periodically transmits the signal 292 to the HVAC controller 150 at periodic time intervals such as, for example, every five seconds. In other embodiments, the period time interval may be adjusted to be greater than or less than five seconds. In still other embodiments, the relative-humidity sensor 290 may transmit the signal 292 to the HVAC controller 150 continuously. In various embodiments, the speed of the variable-speed compressor 140 is controlled responsive to a measured environmental condition of the enclosed space 101 other than the relative humidity of the enclosed space 101.

Still referring to FIGS. 2A-2B, the HVAC controller 150 modulates a speed of the variable-speed compressor 140, a speed of the variable-speed circulation fan 110, and a speed of the variable-speed condenser fan 210 in order to facilitate effective dehumidification of the enclosed space 101. In various embodiments, the speed of the variable-speed compressor 140, the speed of the variable-speed circulation fan 110, and the speed of the variable-speed condenser fan 210 may be modulated individually or in concert.

Figure 3:
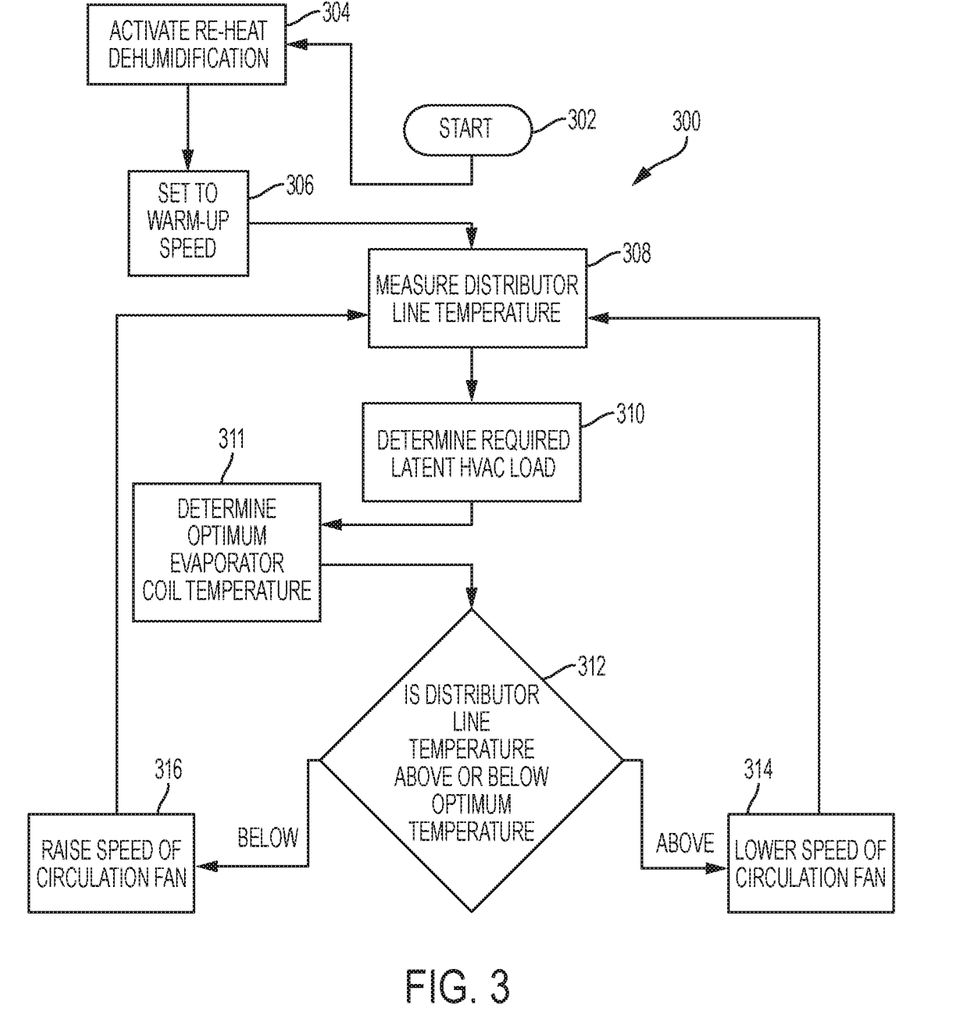
FIG. 3 is a flow diagram illustrating an exemplary process for modulating circulation-fan speed to adjust a degree of air dehumidification applied to an enclosed space.

FIG. 3 is a flow diagram illustrating an exemplary process 300 for dehumidifying conditioned air. For illustrative purposes, the process 300 will be described herein relative to FIGS. 1-2C. The process 300 begins at step 302. At step 304, re-heat dehumidification is activated by a user via, for example, the HVAC controller 150. In a typical embodiment, activation of re-heat dehumidification actuates the three-way valve 262, 222 such that the refrigerant is diverted into the re-heat feed line 264, 224. At step 306, the variable-speed compressor 140, the variable-speed circulation fan 110, and the variable-speed condenser fan 210 are set to a predetermined warm-up speed for a predetermined time period. In a typical embodiment the predetermined warm-up speed is different for each of the variable-speed compressor 140, the variable-speed circulation fan 110, and the variable-speed condenser fan 210. In a typical embodiment, the predetermined time period is, for example, approximately 1 to approximately 3 minutes; however, in other embodiments, other time periods could be utilized. In a typical embodiment, the predetermined warm-up period facilitates normalizing of the variable-speed compressor 140, the variable-speed circulation fan 110, and the variable-speed condenser fan 210 to environmental conditions.

At step 308, a distributor line temperature is measured via the distributor-line temperature sensor 270 and a signal corresponding to the distributor line temperature is transmitted to the HVAC controller 150. In a typical embodiment, the distributor-line temperature sensor 270 is, for example, a thermistor; however, in other embodiments, the distributor-line temperature sensor 270 could be a thermocouple, a thermometer, or other appropriate device as dictated by design requirements. As discussed herein, the distributor line temperature is measured as a proxy for a surface temperature of the evaporator coil 130.

Still referring to FIG. 3, at step 310, the HVAC controller 150 determines a required latent load on the HVAC system 100 based on a relative humidity percentage of the enclosed space 101 and a pre-determined desired relative humidity. In a typical embodiment, the HVAC controller 150 also responds to a length of time the relative humidity percentage of the enclosed space 101 has deviated from the pre-determined desired relative humidity. In a typical embodiment, the relative humidity of the enclosed space 101 is determined via at least one sensor of the plurality of environment sensors 160 such as, for example the relative-humidity sensor 290. In a typical embodiment, the pre-determined desired relative humidity is, for example, input into the HVAC controller 150 via, for example, the user interface 170. In other embodiments, the pre-determined desired relative humidity percentage is input into the HVAC controller 150 by, for example, a user or a manufacturer. At step 311, the HVAC controller 150 determines a calculated optimum evaporator coil temperature that corresponds to the pre-determined desired relative humidity percentage. At step 312, the HVAC controller 150 compares the measured distributor line temperature to the calculated optimum evaporator coil temperature. In a typical embodiment, the optimal distributor line temperature is dependent upon environmental conditions at a given speed of the variable-speed circulation fan 110 and a given speed of the variable-speed compressor 140. In a typical embodiment, the optimal distributor line temperature is used a proxy for an optimal surface temperature of the evaporator coil 130.

Still referring to FIG. 3, if it is determined in step 312 that the measured distributor line temperature is greater than the calculated optimal distributor line temperature as calculated by the HVAC controller 150 to correspond to a desired relative humidity percentage of the enclosed space 101, the process 300 proceeds to step 314. At step 314, the HVAC controller 150 transmits a signal 272 to the variable-speed circulation fan 110 to reduce a speed of the variable-speed circulation fan 110. In a typical embodiment, the signal 272 is transmitted via a wireless or a wired connection. Reduction of the speed of the variable-speed circulation fan 110 lowers a surface temperature of the evaporator coil 130 and increases the latent capacity of the HVAC system 100 thereby allowing the HVAC system 100 to provide further dehumidification without an associated change in air temperature. If it is determined in step 312 that the measured distributor line temperature is less than the calculated optimal distributor line temperature, the process 300 proceeds to step 316. At step 316, the HVAC controller 150 transmits a signal 272 to the variable-speed circulation fan 110 to increase the speed of the variable-speed circulation fan 110. In a typical embodiment, a speed of the variable-speed circulation fan 110 is increased if, for example, the evaporator coil 130 begins freezing. The optimal distributor line temperature varies with indoor dry-bulb temperature, indoor relative humidity, and outdoor temperature. Thus, the desired distributor line temperature must be constantly modulated for optimal results. The process 300 returns to step 308.

Figure 4:
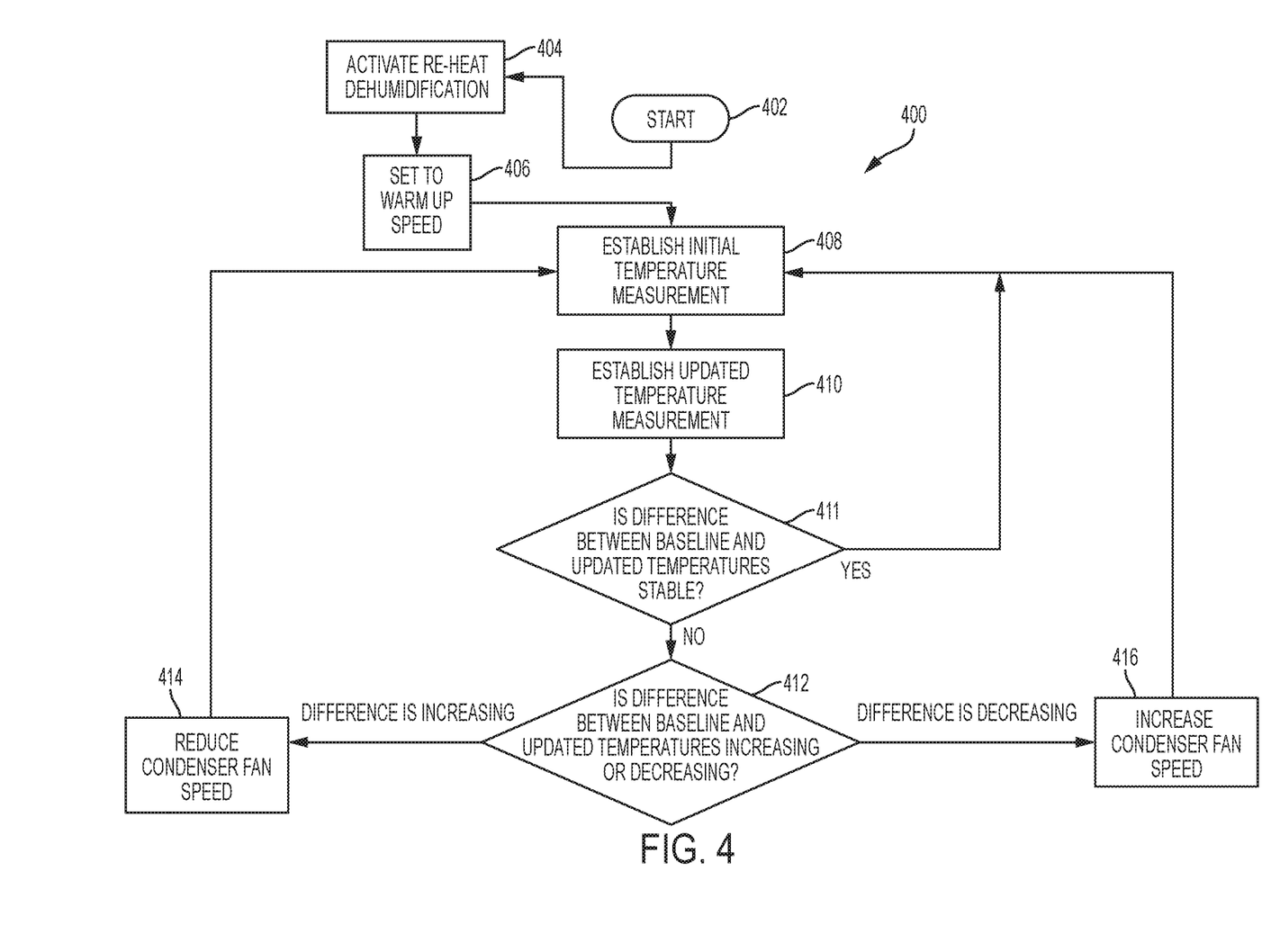
FIG. 4 is a flow diagram illustrating an exemplary process for modulating condenser-fan speed to adjust a degree of air dehumidification applied to an enclosed space.

FIG. 4 is a flow diagram that illustrates a process 400 for dehumidifying conditioned air. For illustrative purposes, the process 400 will be described herein relative to FIGS. 1-2C. The process 400 begins at step 402. At step 404, re-heat dehumidification is activated by a user via, for example, the HVAC controller 150. In a typical embodiment, activation of re-heat dehumidification actuates the three-way valve 262, 222 such that the refrigerant is diverted into the re-heat feed line 264, 224. At step 406, the variable-speed compressor 140, the variable-speed circulation fan 110, and the variable-speed condenser fan 210 are set to a predetermined warm-up speed for a predetermined time period. In a typical embodiment, the predetermined time period is, for example, approximately 1 to approximately 3 minutes; however, in other embodiments, other time periods could be utilized. In a typical embodiment, the predetermined warm-up period facilitates normalizing of the variable-speed compressor 140, the variable-speed circulation fan 110, and the variable-speed condenser fan 210 to environmental conditions.

At step 408, an initial air temperature measurement is taken. In a typical embodiment, the initial air temperature measurement is a difference between an air temperature in the return air duct 254 and an air temperature in the supply air duct 256; however, in other embodiments, the initial air temperature measurement could be an air temperature of in the supply air duct 256, an air temperature in the return air duct 256, or an air temperature in the enclosed space 101. At step 410, an updated air temperature measurement is taken. In a typical embodiment, the updated air temperature measurement is an updated difference between an air temperature in the return air duct 254 and an air temperature in the supply air duct 256; however, in other embodiments, the updated air temperature measurement could be an updated air temperature of in the supply air duct 256, an updated air temperature in the return air duct 256, or an updated air temperature in the enclosed space 101.

At step 411, the HVAC controller 150 determines if a difference between the initial temperature measurement and the updated temperature measurement has been stable over time. In a typical embodiment, the difference between the initial air temperature measurement and the updated air temperature measurement is measured at five-second intervals; however, in other embodiments, any time interval could be utilized as dictated by design requirements such as, for example, less than one second to five minutes or more. If it is determined at step 411 that the difference between the initial temperature measurement and the updated temperature measurement remains stable over time, the process 400 returns to step 408. If it is determined at step 411 that the difference between the initial temperature measurement and the updated temperature measurement has not remained stable over time, the process proceeds to step 412.

At step 412, the HVAC controller 150 determines whether the difference between the initial temperature measurement and the updated temperature measurement has been increasing or decreasing. In a typical embodiment, an increase in the difference between the initial temperature measurement and the updated temperature measurement indicates that the package HVAC system 200 or the split HVAC system 200' is over-cooling the conditioned air. In a typical embodiment, the determination of over-cooling is dependent on outdoor-air temperature.

If it is determined at step 412 that the difference between the initial temperature measurement and the updated temperature measurement has been increasing, the process 400 proceeds to step 414. At step 414, the HVAC controller 150 transmits a signal 288 to the variable-speed condenser fan 210 to reduce a speed of the variable-speed condenser fan 210. Reduction of the speed of the variable-speed condenser fan 210 serves to mitigate over-cooling by the package HVAC system 200 or the split HVAC system 200', thereby allowing the package HVAC system 200 or the split HVAC system 200' to provide further air dehumidification without an associated change in air temperature. In various embodiments, the HVAC controller 150 transmits a signal to the variable-speed condenser fan 210 to turn off the variable-speed condenser fan 210. In other embodiments, the HVAC controller 150 cycles the variable-speed condenser fan 210 between different speeds or between an operational state and a turned-off state.

If it is determined at step 412 that the difference between the initial temperature measurement and the updated temperature measurement has been decreasing, the process 400 proceeds to step 416. At step 416, the HVAC controller 150 transmits a signal 288 to the variable-speed condenser fan 210 to increase a speed of the variable-speed condenser fan 210. Increasing a speed of the variable-speed condenser fan 210 serves to mitigate under cooling by the package HVAC system 200 or the split HVAC system 200'. The process 400 then returns to step 408.

Figure 5:
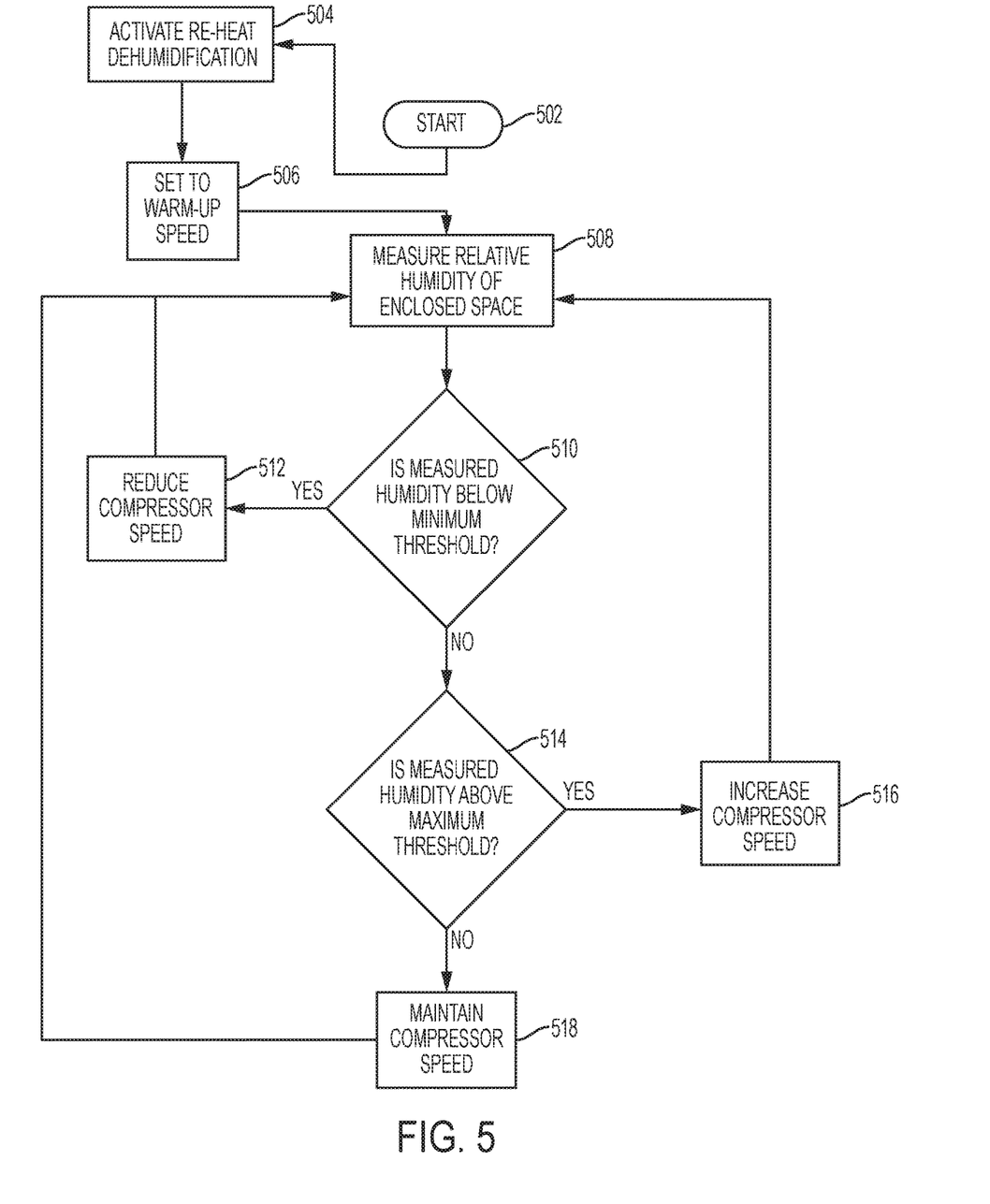
FIG. 5 is a flow chart illustrating an exemplary process for modulating compressor speed to adjust a degree of air dehumidification applied to an enclosed space.

FIG. 5 is a flow diagram that illustrates a process 500 for dehumidifying conditioned air. For illustrative purposes, the process 500 will be described herein relative to FIGS. 1-2C. The process 500 begins at step 502. At step 504, re-heat dehumidification is activated by a user via, for example, the HVAC controller 150. In a typical embodiment, activation of re-heat dehumidification actuates the three-way valve 262, 222 such that the refrigerant is diverted into the re-heat feed line 264, 224. At step 506, the variable-speed compressor 140, the variable-speed circulation fan 110, and the variable-speed condenser fan 210 are set to a predetermined warm-up speed for a predetermined time period. In a typical embodiment, the predetermined time period is, for example, approximately 1 to approximately 3 minutes; however, in other embodiments, other time periods could be utilized. In a typical embodiment, the predetermined warm-up period facilitates normalizing of the variable-speed compressor 140, the variable-speed circulation fan 110, and the variable-speed condenser fan 210 to environmental conditions.

At step 508, the relative-humidity sensor 290 measures a relative humidity of the air in the enclosed space 101. Also, at step 508, the relative-humidity sensor 290 transmits the measured relative humidity of air in the enclosed space 101 to the HVAC controller 150. The relative-humidity sensor 290 transmits the measured relative humidity of the enclosed space 101 to the HVAC controller 150 via a wired connection or a wireless connection. At step 510, the HVAC controller 150 determines if the relative humidity of the air in the enclosed space is below the minimum humidity threshold of the acceptable humidity percentage range. In step 510, if it is determined that the measured relative humidity of the air in the enclosed space 101 is below the minimum humidity threshold of the acceptable humidity percentage range, then the process 500 proceeds to step 512. At step 512, a speed of a variable-speed compressor 140 is decreased. Decreasing the speed of the variable-speed compressor 140 decreases the latent capacity of the HVAC system 200 and the split HVAC system 200' and reduces the amount of moisture removed from the air in the enclosed space 101. The process 500, then returns to step 508.

In step 510, if it is determined that the measured relative humidity of the air in the enclosed space 101 is above the minimum humidity threshold of the acceptable humidity percentage range, then the process 500 proceeds to step 514. At step 514, the HVAC controller 150 determines if the measured relative humidity of the air in the enclosed space 101 is above the maximum humidity threshold of the acceptable humidity percentage range. In step 514, if it is determined that the measured relative humidity of the air in the enclosed space 101 is above the maximum humidity threshold of the acceptable humidity percentage range, then the process 500 proceeds to step 516. At step 516, the speed of the variable-speed compressor 140 is increased. Increasing the speed of the variable-speed compressor 140 increases the latent capacity of the package HVAC system 200 and the split HVAC system 200' and facilitates the package HVAC system 200 or the split HVAC system 200' removing additional humidity from the air in the enclosed space 101. The process 500 then returns to step 508. If, at step 514, it is determined that the measured relative humidity of the air in the enclosed space is below the maximum humidity threshold of the acceptable humidity percentage range, then the process 500 proceeds to step 518. At step 518, the speed of the variable-speed compressor 140 is maintained and the process 500 then returns to step 508.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive (MOD), a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the HVAC controller 150, one or more portions of the user interface 170, one or more portions of the zone controller 180, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system for regulating humidity of an enclosed space, the HVAC system comprising:
   a variable-speed circulation fan for circulating air around an evaporator coil;
   a condenser coil fluidly coupled to a thermostatic expansion valve;
   a variable-speed compressor fluidly coupled to the condenser coil and the evaporator coil;
   a controller operatively coupled to the variable-speed compressor;
   a variable-speed condenser fan operatively coupled to the controller for circulating air around the condenser coil;
   a first temperature sensor disposed in a return air duct, the first temperature sensor being operatively coupled to the controller;
   a second temperature sensor disposed in a supply air duct, the second temperature sensor being operatively coupled to the controller, the first temperature sensor and the second temperature sensor measuring a temperature difference between the return air duct and the supply air duct;
   wherein the controller is configured to:
      determine if the temperature difference is changing or stable;
      responsive to a determination that the temperature difference is changing, adjust a speed of the variable-speed condenser fan; and
      responsive to a determination that the temperature difference is stable, take no action relative to the speed of the variable-speed condenser fan.

2. The HVAC system of claim 1, wherein the adjustment of the speed of the variable-speed condenser fan comprises reducing a speed of the variable-speed condenser fan responsive to a determination that the temperature difference is increasing.

3. The HVAC system of claim 1, wherein the adjustment of the speed of the variable-speed condenser fan comprises increasing the speed of the variable-speed condenser fan responsive to a determination that the temperature difference is decreasing.

4. The HVAC system of claim 1, further comprising:
   a three-way valve fluidly coupled to the condenser coil;
   a re-heat coil fluidly coupled to the three-way valve, the re-heat coil being positioned downwind of the evaporator coil; and
   a humidity sensor operatively coupled to the controller and exposed to the enclosed space, wherein the humidity sensor is configured to measure the relative humidity of the enclosed space and detect if the relative humidity of the enclosed space exceeds the maximum humidity threshold or falls below the minimum humidity threshold.

5. The HVAC system of claim 4, wherein the humidity sensor measures the relative humidity of the enclosed space at periodic time intervals.

6. The HVAC system of claim 5, wherein the periodic time intervals comprise five seconds.

7. The HVAC system of claim 1, wherein the HVAC system is a package HVAC system.

8. The HVAC system of claim 1, wherein the HVAC system is a split HVAC system.

9. The HVAC system of claim 1, comprising:
   the variable-speed circulation fan for circulating air around the evaporator coil and operatively coupled to the controller;
   a distributor line temperature sensor thermally exposed to a distributor line and operatively coupled to the controller; and
   wherein the controller adjusts a speed of the variable-speed circulation fan to increase latent capacity of the HVAC system responsive to a determination that a temperature of fluid in the distributor line exceeds an optimal distributor line temperature.

10. The HVAC system of claim 9, wherein the speed of the variable-speed compressor is adjusted prior to adjusting the speed of the variable-speed circulation fan.

11. The HVAC system of claim 1, wherein the speed of the variable-speed compressor is adjusted prior to adjusting the speed of the variable-speed condenser fan.

12. The HVAC system of claim 1, wherein the controller is configured to increase a speed of the variable-speed compressor responsive to a determination that the relative humidity of the enclosed space exceeds the maximum humidity threshold.

13. A method of regulating humidity of an enclosed space, the method comprising:
   activating a variable-speed compressor, a variable-speed circulation fan, and a variable-speed condenser fan at a predetermined warm-up speed for a predetermined time period to normalize the variable-speed compressor, the variable-speed circulation fan, and the variable-speed condenser fan to environmental conditions;
   measuring, using a first temperature sensor disposed in a return air duct, air temperature in the return air duct;
   measuring, using a second temperature sensor disposed in a supply air duct, air temperature in the supply air duct;
   calculating a temperature difference between the air temperature in the return air duct and the air temperature in the supply air duct;
   determining if the temperature difference is changing or stable;
   responsive to a determination that the temperature difference is changing, adjusting a speed of the variable-speed condenser fan; and
   responsive to a determination that the temperature difference is stable, taking no action relative to the speed of the variable-speed condenser fan.

14. The method of claim 13, wherein the adjusting comprises reducing the speed of the variable-speed condenser fan responsive to a determination that the temperature difference is increasing.

15. The method of claim 14, wherein the adjusting comprises increasing the speed of the variable-speed condenser fan responsive to a determination that the temperature difference is decreasing.

16. The method of claim 15, wherein the predetermined time period comprises three minutes.

17. The method of claim 13, further comprising:
measuring, using a humidity sensor operatively coupled to the controller and exposed to the enclosed space, relative humidity of the enclosed space;
determining if the relative humidity of the enclosed space exceeds a maximum humidity threshold or falls below a minimum humidity threshold; and
responsive to a determination that the relative humidity of the enclosed space exceeds the maximum humidity threshold, increasing a speed of the variable-speed compressor.

18. A heating, ventilation, and air conditioning (HVAC) system for regulating humidity of an enclosed space, the HVAC system comprising:
a variable-speed circulation fan for circulating air around an evaporator coil;
a condenser coil fluidly coupled to a thermostatic expansion valve;
a variable-speed compressor fluidly coupled to the condenser coil and the evaporator coil;
a controller operatively coupled to the variable-speed compressor;
a variable-speed condenser fan operatively coupled to the controller for circulating air around the condenser coil;
a first temperature sensor disposed in a return air duct, the first temperature sensor being operatively coupled to the controller;
a second temperature sensor disposed in a supply air duct, the second temperature sensor being operatively coupled to the controller, the first temperature sensor and the second temperature sensor measuring a temperature difference between the return air duct and the supply air duct;
wherein the controller is configured to:
determine if the temperature difference is increasing, decreasing, or stable;
responsive to a determination that the temperature difference is increasing, decrease a speed of the variable-speed condenser fan;
responsive to a determination that the temperature difference is decreasing, increase a speed of the variable-speed condenser fan; and
responsive to a determination that the temperature difference is stable, take no action relative to a speed of the variable-speed condenser fan.

\* \* \* \* \*